(12) United States Patent
Ballabio et al.

(10) Patent No.: US 9,289,956 B2
(45) Date of Patent: Mar. 22, 2016

(54) METHOD FOR CONTROLLING THE DEPOSITION OF ELEMENTARY SEMIFINISHED PRODUCTS IN A PROCESS FOR BUILDING TYRES FOR VEHICLE WHEELS

(71) Applicant: PIRELLI TYRE S.P.A., Milan (IT)

(72) Inventors: Michele Ballabio, Milan (IT); Gaetano Lo Presti, Milan (IT); Bartolomeo Montrucchio, Turin (IT); Vincenzo Orlando, Turin (IT)

(73) Assignees: Pirelli Tyre S.p.A., Milan (IT); Politecnico Di Torino, Turin (IT)

( * ) Notice: Subject to any disclaimer, the term of this patent is extended or adjusted under 35 U.S.C. 154(b) by 0 days.

(21) Appl. No.: 14/364,573

(22) PCT Filed: Dec. 11, 2012

(86) PCT No.: PCT/IB2012/057163
§ 371 (c)(1),
(2) Date: Jun. 11, 2014

(87) PCT Pub. No.: WO2013/088334
PCT Pub. Date: Jun. 20, 2013

(65) Prior Publication Data
US 2014/0341460 A1  Nov. 20, 2014

Related U.S. Application Data

(60) Provisional application No. 61/578,113, filed on Dec. 20, 2011.

(30) Foreign Application Priority Data

Dec. 13, 2011 (IT) .............................. MI2011A2253

(51) Int. Cl.
| | |
|---|---|
| *B60C 25/00* | (2006.01) |
| *B29D 30/00* | (2006.01) |
| *G01M 17/02* | (2006.01) |
| *G06K 9/62* | (2006.01) |
| *G06T 7/00* | (2006.01) |

(52) U.S. Cl.
CPC .......... *B29D 30/0061* (2013.01); *B60C 25/007* (2013.04); *G01M 17/027* (2013.01); *G06K 9/6201* (2013.01); *G06T 7/001* (2013.01); *B29D 2030/0066* (2013.01); *G06T 2207/30164* (2013.01)

(58) Field of Classification Search
CPC ...... B60R 1/12; G01M 17/027; G01M 17/02; H04N 5/2353; G03B 7/083; B60C 25/007
USPC ............................................................. 73/146
See application file for complete search history.

(56) References Cited

U.S. PATENT DOCUMENTS

| | | | | |
|---|---|---|---|---|
| 1,788,862 | A * | 1/1931 | Burgess ...................... 301/10.1 |
| 2,156,440 | A * | 5/1939 | Veber ............................. 352/84 |
| 2,168,986 | A * | 8/1939 | Harris ........................... 105/153 |
| 3,644,047 | A * | 2/1972 | Brown ................ G01M 17/027 356/458 |
| 3,874,306 | A * | 4/1975 | Coons et al. ................. 105/72.2 |
| 4,146,926 | A   | 3/1979 | Clerget et al. |
| 4,842,413 | A   | 6/1989 | Kuijpers et al. |
| 5,206,720 | A   | 4/1993 | Clothiaux et al. |
| 6,433,874 | B2 * | 8/2002 | Lindsay ........................ 356/458 |
| 7,755,772 | B2 * | 7/2010 | Takahashi .......... G01B 11/2522 356/601 |
| 8,780,189 | B2 * | 7/2014 | Kilian ............................. 348/61 |
| 2001/0052259 | A1 | 12/2001 | Mahner |
| 2008/0028846 | A1 |  2/2008 | Heath et al. |
| 2014/0288689 | A1 * | 9/2014 | Ballabio ............... B29D 30/16 700/99 |

FOREIGN PATENT DOCUMENTS

| | | |
|---|---|---|
| DE | 100 36 010 | 2/2002 |
| JP | 2004-351810 | 12/2004 |
| JP | 2011-007633 | 1/2011 |

OTHER PUBLICATIONS

Hatori, Trams making Way for Light Rail Transit [on-line], Mar. 2004 [retrieved Oct. 3, 2014], Japan Railway & Transport Review No. 38, pp. 30-40. Retrieved from the Internet: http://www.jrtr.net/backissue/index_backissue.html.*

International Search Report from the European Patent Office for the International Application No. PCT/IB2012/057163, mailing date May 10, 2013.
Written Opinion of the International Searching Authority from the European Patent Office for International Application No. . PCT/IB2012/057163, mailing date May 10, 2013.

\* cited by examiner

*Primary Examiner* — Matthew Bella
*Assistant Examiner* — Dennis Rosario
(74) *Attorney, Agent, or Firm* — Finnegan, Henderson, Farabow, Garrett & Dunner, L.L.P.

(57) ABSTRACT

A method and apparatus for controlling the deposition of elementary semifinished products in a process for building tires for vehicle wheels includes: driving in rotation, around a rotation axis, at a rotation speed between about $\pi/8$ rad/s and about $6\pi$ rad/s, a tire being processed which tire has a radially external surface including one or more elementary semifinished products; sending a first electromagnetic radiation to the radially external surface, the latter generating a corresponding first reflected radiation; detecting, through a first detecting device, at least one first image representative of the first reflected radiation; controlling the first detecting device in such a manner that a first exposure time for detecting the at least one first image is included between about 0.1 s and about 10 s; carrying out a first comparison between the at least one first image and one or more reference data; and generating a first notification signal as a function of the first comparison.

41 Claims, 5 Drawing Sheets

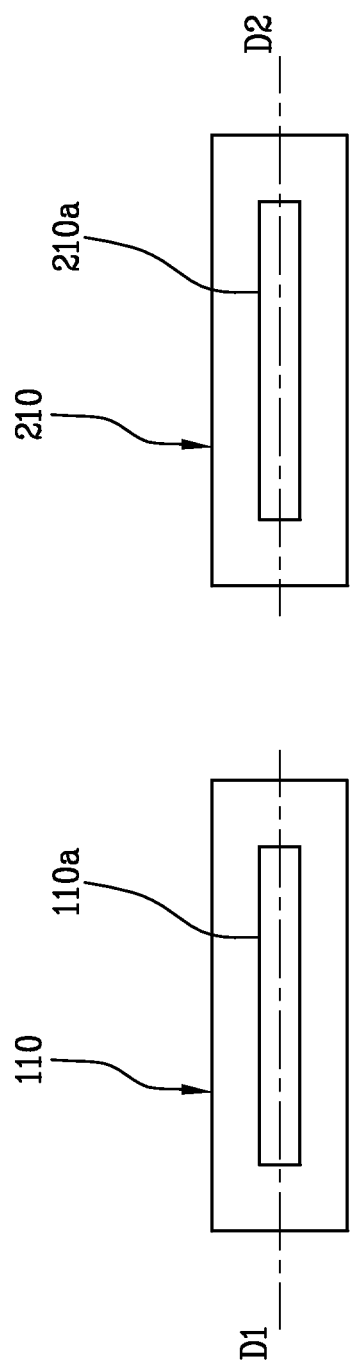

METHOD FOR CONTROLLING THE DEPOSITION OF ELEMENTARY SEMIFINISHED PRODUCTS IN A PROCESS FOR BUILDING TYRES FOR VEHICLE WHEELS

CROSS REFERENCE TO RELATED APPLICATIONS

This application is a national phase application based on PCT/IB2012/057163, filed Dec. 11, 2012, which claims the priority of Italian Patent Application No. MI2011A002253, filed Dec. 13, 2011, and the benefit of U.S. Provisional Application No. 61/578,113, filed Dec. 20, 2011, the content of each application being incorporated herein by reference.

BACKGROUND OF THE INVENTION

1. Field of the Invention

The present invention regards a method for controlling the deposition of elementary semifinished products in a process for building tyres for vehicle wheels. The invention also refers to an apparatus for controlling the deposition of elementary semifinished products in a process for building tyres for vehicle wheels.

2. Description of the Related Art

A tyre for vehicle wheels generally comprises a carcass structure comprising at least one carcass ply having respectively opposite end flaps respectively engaged to annular anchoring structures, integrated in the areas usually referred to as "beads", defining the radially internal circumferential edges of the tyre.

A belt structure comprising one or more belt layers, positioned radially superimposed on each other and relative to the carcass ply, having textile or metallic reinforcement cords cross-oriented and/or substantially parallel to the circumferential direction of extension of the tyre is associated to the carcass structure. A tread band, also made of elastomeric material, just like the other semifinished products constituting the tyre, is applied in radially external position.

In addition, respective sidewalls of elastomeric material are applied in axially external position onto the side surfaces of the carcass structure, each extending from one of the side edges of the tread band until close to the respective annular anchoring structure to the beads. In tyres of the "tubeless" type, an airtight cover layer, usually referred to as "liner", covers the inner surfaces of the tyre.

The invention particularly applies to processes in which the tyres are built by associating elementary semifinished products to each other, depositing the same on suitable forming supports.

Depending on the type of process used, the forming support may be a substantially toroidal-shaped or substantially cylindrical-shaped building drum.

The expression "elementary semifinished product" is used to indicate a continuous elongated element, preferably having a flat transverse section, made of elastomeric material. Preferably said "elementary semifinished product" is a piece of said elongated element cut to size. Even more preferably said "elementary semifinished product" embeds one or more reinforcement textile or metallic cords arranged parallel relative to each other in the longitudinal direction of the same elongated element.

Such elementary semifinished products, when comprising the aforementioned reinforcement cords, if they have a major longitudinal dimension are referred to as "strip-like elements" hereinafter. The strip-like elements, suitably approached or partly superimposed on each other, cooperate to form various components of a tyre. In particular, the strip-like elements may be used for the manufacturing one or more carcass plies of the carcass structure and/or one or more belt strips or layers of the belt structure of the tyre.

In some cases, the semifinished elements may also have a longitudinal dimension and a transverse dimension comparable to each other, preferably substantially equal to each other. In such case they are plate-like elements, having a substantially quadrangular shape in plain view. Elementary semifinished products of this type may be used, in tyre building, and they are hereinafter referred to as "reinforcement elements".

The expression "elementary semifinished product" is also used to indicate a component of the tyre made of elastomeric material not reinforced by cords.

The expression "tyre being processed" is used to indicate a forming support of the tyre with at least one component portion of the tyre deposited on the support itself.

The expression "component" of the tyre is used to indicate any component adapted to serve a function in the tyre or a portion thereof, selected for example from among: liner, under-liner, carcass ply/plies, under-belt insert, belt strips both crossed with respect to each other and of the zero degree type, bonding sheet for the tread band, tread band, sidewalls, bead core, bead filling, textile, metallic reinforcement inserts or inserts made of elastomeric material alone, anti-abrasive inserts, sidewall inserts.

The expression "detecting an image" is used to indicate a matrix of spots or frames, in analogue or digital format, provided as output by a detecting device, and defined by the incident radiation on a detecting window of such device in a given time interval, referred to as "exposure time" or "shutter speed". During this time interval the device is maintained uninterruptedly active, in such a manner that all detectable radiations which, in the time interval, have an impact on the detecting window, are represented in a single image, i.e. the detected image. The radiation (or radiations) which cooperate/s to form the image are those to which the detecting device is sensitive, and they are comprised, for example, in a given interval of wavelengths.

SUMMARY OF THE INVENTION

The Applicant observed that, with reference to the aforementioned elementary semifinished products, an extremely important factor that may jeopardize the quality of the tyre consists in an incorrect positioning of the latter. Actually, it may occur that the strip-like elements are not accurately positioned with respect to the centreline plane of the building drum, or that the reinforcement elements deposited previously during the turn-up step are not positioned in a circumferentially uniform manner and symmetrically with respect to said symmetry plane of the building drum. Analogously, components of the tyre made of elastomeric material not reinforced by cords, obtained for example by depositing turns arranged axially adjacent and radially at least partially superimposed, may not have been built with the correct positioning with respect to a symmetry plane of the building drum.

The Applicant observed that another factor that may negatively affect the quality of the tyre lies in the possible errors when depositing the elementary semifinished products, which may cause longitudinal misalignment between the elementary semifinished products, or also absence of the latter due to lack of depositions.

The Applicant observed that the prior art solutions are not capable of detecting possible errors or inaccuracies in the deposition of the elementary semifinished products in a simple, inexpensive and reliable manner. In particular, the efficient application of the control systems of the known type without reducing the times for producing and/or depositing the elementary semifinished products requires using high performance detection structures, as well as apparatus with extremely complex hardware/software.

The Applicant observed that it is possible to drastically reduce the hardware requirements of the system, as well as the computational complexity of the software used, by detecting images and photograms with a greater exposure time with respect to the conventional "instantaneous" images when driving the forming drum. Thus, such detected images or photograms are representative of the integral or superimposition, in the exposure time, of the instantaneous images representing the tyre being processed on the forming drum during the rotation of the latter. In other words, the drum is rotated before a detecting device at a given speed; the detecting device is set in such a manner that the exposure time at which the images are detected allows representing, in a single image, a portion of tyre being processed having dimensions much larger than those of the portion that could be represented with a single "instantaneous" image. However, given that the dimensions of the detected image are substantially identical to those of a hypothetical instantaneous image, the representation of a larger portion of the tyre being processed is obtained by superimposing (or, as mentioned more precisely above, through the integral) the hypothetical instantaneous images that were detected during the entire exposure time.

Lastly, the Applicant has found that the control of the deposition of the elementary semifinished products may be carried out by detecting one or more images as indicated above, and comparing them with reference parameters, to verify whether the deposition of said elementary semifinished products was carried out as provided for, or whether, vice versa, the elementary semifinished products were not positioned according to the design specifications. Such reference parameters may comprise both preset data, representative of optimal deposition and data derived from the previous detecting operations.

According to a first aspect, the invention refers to a method for controlling the deposition of elementary semifinished products in a process for building tyres for vehicle wheels.

The aforementioned method comprises at least one of the following actions:
  driving a tyre being processed in rotation around a rotation axis, at a rotation speed included between about $\pi/8$ rad/s and about $6\pi$ rad/s, which tyre has a radially external surface comprising one or more elementary semifinished products;
  sending a first electromagnetic radiation to said radially external surface, the latter generating a corresponding first reflected radiation;
  detecting, through a first detecting device, at least one first image representative of said first reflected radiation;
  controlling said first detecting device in such a manner that a first exposure time for detecting said at least one first image is included between about 0.1 s and about 10 s;
  carrying out a first comparison between said at least one first image and one or more reference data;
  generating a first notification signal as a function of said first comparison.

The Applicant deems that the aforementioned method allows efficiently controlling the correct deposition of the elementary semifinished products on the forming drum and hence obtaining tyres built according to the design specifications repeatably over time, the entirety being obtained by employing relatively simple and inexpensive hardware and software systems.

According to a second aspect, the invention refers to an apparatus for controlling the deposition of elementary semifinished products in a process for building tyres for vehicle wheels.

The aforementioned apparatus may comprise:
  an actuating member for driving a tyre being processed in rotation around a rotation axis, at a rotation speed included between about $\pi/8$ rad/s and about $6\pi$ rad/s, which tyre has a radially external surface comprising one or more elementary semifinished products;
  a first emitter device adapted to send a first electromagnetic radiation to said radially external surface, the latter generating a corresponding first reflected radiation;
  a first detecting device adapted to detect at least one first image representative of said first reflected radiation;
  a control unit.

The aforementioned control unit is preferably configured for:
a) controlling said first detecting device in such a manner that a first exposure time for detecting said at least one first image is included between about 0.1 s and about 10 s;
b) carrying out a first comparison between said at least one first image and one or more reference data;
c) generating a first notification signal as a function of said first comparison.

According to a third aspect, the invention refers to a method for controlling the deposition of elementary semifinished products in a process for building tyres for vehicle wheels.

The aforementioned method comprises at least one of the said actions:
  driving in rotation, around a rotation axis, a tyre being processed which tyre has a radially external surface comprising one or more elementary semifinished products;
  sending a first electromagnetic radiation to said radially external surface, the latter generating a corresponding first reflected radiation;
  detecting, through a first detecting device, at least one first image representative of said first reflected radiation;
  controlling said first detecting device in such a manner that a first exposure time for detecting said at least one first image is at least equal to the time employed by said tyre being processed for carrying out a full revolution around said rotation axis;
  carrying out a first comparison between said at least one first image and one or more reference data;
  generating a first notification signal as a function of said first comparison.

According to a fourth aspect, the invention refers to an apparatus for controlling the deposition of elementary semifinished products in a process for building tyres for vehicle wheels.

The aforementioned apparatus may comprise:
  an actuating member for driving in rotation, around a rotation axis, a tyre being processed which tyre has a surface radially comprising one or more elementary semifinished products;
  a first emitter device adapted to send a first electromagnetic radiation to said radially external surface, the latter generating a corresponding first reflected radiation;
  a first detecting device adapted to detect at least one first image representative of said first reflected radiation;
  a control unit.

The aforementioned control unit is preferably configured for:
a) controlling said first detecting device in such a manner that a first exposure time for detecting said at least one first image is at least equal to the time employed by said tyre being processed for carrying out a full revolution around said rotation axis;
b) carrying out a first comparison between said at least one first image and one or more reference data;
c) generating a first notification signal as a function of said first comparison.

The present invention, according to one or more of the aforementioned aspects, may have one or more of the preferred characteristics described hereinafter.

Preferably a rotation speed of said tyre being processed is comprised between about $\pi/8$ rad/s and about $6\pi$ rad/s.

In particular, the rotation speed of said tyre being processed is comprised between about $\pi/2$ rad/s and about $2\pi$ rad/s.

Preferably a first exposure time for detecting said at least one first image is included between about 0.1 s and about 10 s.

In particular said first exposure time is included between about 1 s and about 4 s.

Preferably said first exposure time is equal to at least the time employed by said tyre being processed for carrying out a full revolution around said rotation axis.

Thus, a single image may entirely represent the external surfaces of the tyre being processed, in a simple manner and occupying much less storage space.

Preferably said control unit may be configured for also controlling the aforementioned actuating member, in particular for regulating the rotation speed of the tyre being processed.

Preferably said first detecting device is provided with a detecting window having a major direction of extension substantially parallel to the rotation axis of said tyre being processed.

Preferably said first detecting device is positioned on a first detection plane joining said first detecting device to a first region of incidence of said radially external surface impinged on by said first electromagnetic radiation.

Preferably at least one first emitter device for sending said first electromagnetic radiation towards said radially external surface is provided for.

Preferably said first emitter device is positioned on a first emission plane joining said first emitter device to a first region of incidence of radially external surface impinged on by said first electromagnetic radiation.

Preferably said first detection plane defines with said first emission plane an angle included between about 30° and about 60°. In particular said angle may be substantially equal to about 45°.

This allows obtaining an ideal compromise between the quantity of light reflected by the radially external surface of the tyre being processed, and the precision with which the radiated profiles may be determined.

Preferably said one or more reference data comprise data defined as a function of the previous detecting operations carried out by said first detecting device.

This allows verifying the repeatability of the performed operations, such as for example the semi-finished products deposition operations, over time.

Preferably said one or more reference data comprise data defined on a statistical basis as a function of the previous detecting operations.

Thus, this allows calculating summary parameters which may provide, indications regarding the overall quality of the tyre in a simple and quick manner.

Preferably said first notification signal is representative of a positioning of one or more of said elementary semifinished products.

Preferably said first notification signal is representative of a lack of deposition of at least one elementary semifinished product.

Preferably, a second electromagnetic radiation is sent by a second emitter device to said radially external surface, the latter generating a corresponding second reflected radiation. At least one second image representative of said second reflected radiation is then detected through a second detecting device. Said second detecting device is controlled in such a manner that a second exposure time for detecting said at least one second image representative of said second reflected radiation is included between about 0.1 s and about 10 s. Then a second comparison between said at least a second image and one or more reference data is carried out, and a second notification signal is generated as a function of said second comparison.

Preferably said second exposure time is included between about 1 s and about 4 s.

Preferably said second exposure time is equal to at least the time employed by said tyre being processed for carrying out a full revolution around said rotation axis.

Preferably said first and second exposure time are substantially equal to each other.

Preferably said first electromagnetic radiation strikes on a first region of said radially external surface, and said second electromagnetic radiation strikes on a second region of said radially external surface.

In particular said first and second region are defined by respective axial-end regions of said tyre being processed.

Thus, the first and the second image may represent different portions of the tyre being processed, such as for example the axial ends of the latter, so as to verify the correct deposition of the reinforcement elements and/or the opposite ends of single strip-like elements.

Preferably said first electromagnetic radiation has a wavelength comprised between 500 nm and 700 nm.

In particular, said first electromagnetic radiation has a wavelength comprised between 600 nm and 650 nm.

Preferably said second electromagnetic radiation has a wavelength comprised between 500 nm and 700 nm.

In particular, said second electromagnetic radiation has a wavelength comprised between 600 nm and 650 nm.

Preferably said first and second electromagnetic radiation substantially have the same wavelength.

Preferably said first detecting device comprises a CCD sensor, operating at 8 bits or 16 bits.

Preferably said second detecting device comprises a CCD sensor, operating at 8 bits or 16 bits.

Preferably said control unit is also configured for:
a') controlling said second detecting device in such a manner that a second exposure time for detecting said at least a second image is included between about 0.1 s and about 10 s;
b') carrying out said second comparison between said at least one second image and one or more reference data;
c') generating said second notification signal as a function said second comparison.

Preferably said second detecting device is provided with a second detecting window having a major direction of extension substantially parallel to the rotation axis of said tyre being processed.

Preferably said second detecting device is positioned on a second detection plane joining said second detecting device to a second region of incidence of said radially external surface impinged on by said second electromagnetic radiation.

Preferably said second emitter device is positioned on a second emission plane joining said second emitter device to a second region of incidence of radially external surface impinged on by said second electromagnetic radiation.

Preferably said second detection plane defines with said second emission plane an angle included between about 30° and about 60°.

Preferably a forming support of said tyre being processed has a cylindrical or toroidal shape having diameter included between 18" and 24".

Further characteristics and advantages shall be more apparent from the detailed description of a preferred and non-limiting embodiment.

BRIEF DESCRIPTION OF THE DRAWINGS

Such description is provided hereinafter with reference to the attached figures, also provided solely by way of non-limiting example, wherein:

FIG. 5 schematically shows structural details of elements part of the apparatus of FIG. 1.

DETAILED DESCRIPTION OF THE INVENTION

With reference to the attached figures, a tyre being processed comprising elementary semifinished products whose deposition is controlled through the method and/or the apparatus according to the invention was indicated with 10.

The tyre being processed 10 comprises a forming support 50, for example cylindrical or toroidal-shaped.

Figure 1:
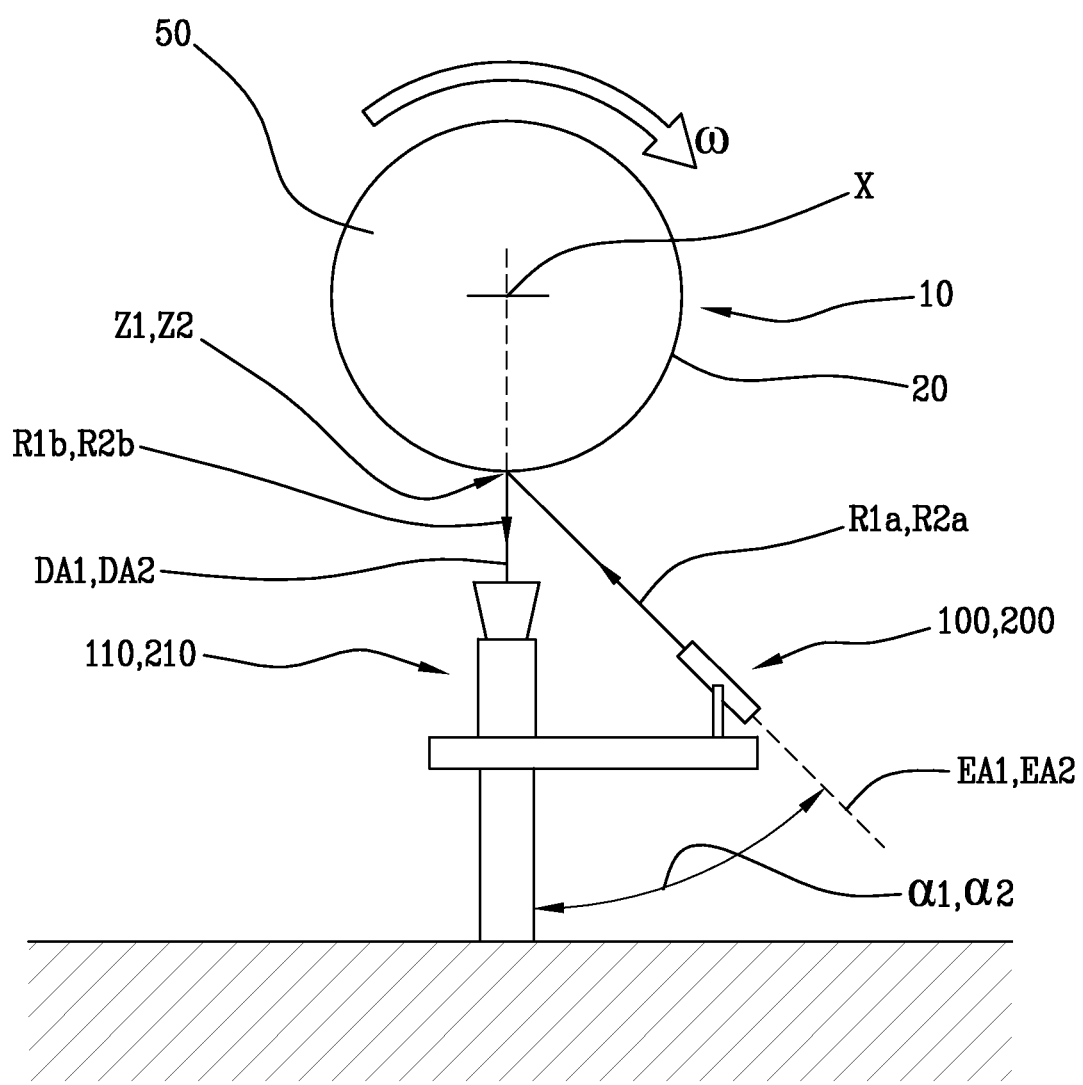
FIG. 1 schematically shows a side view of an apparatus according to the invention.

The forming support 50 is schematically illustrated in FIG. 1.

Preferably the forming support 50 has a diameter included between 18" and 24", and in particular included between 18" and 22".

The tyre being processed 10 has a radially external surface 20, which comprises one or more elementary semifinished products 30.

Figure 3:
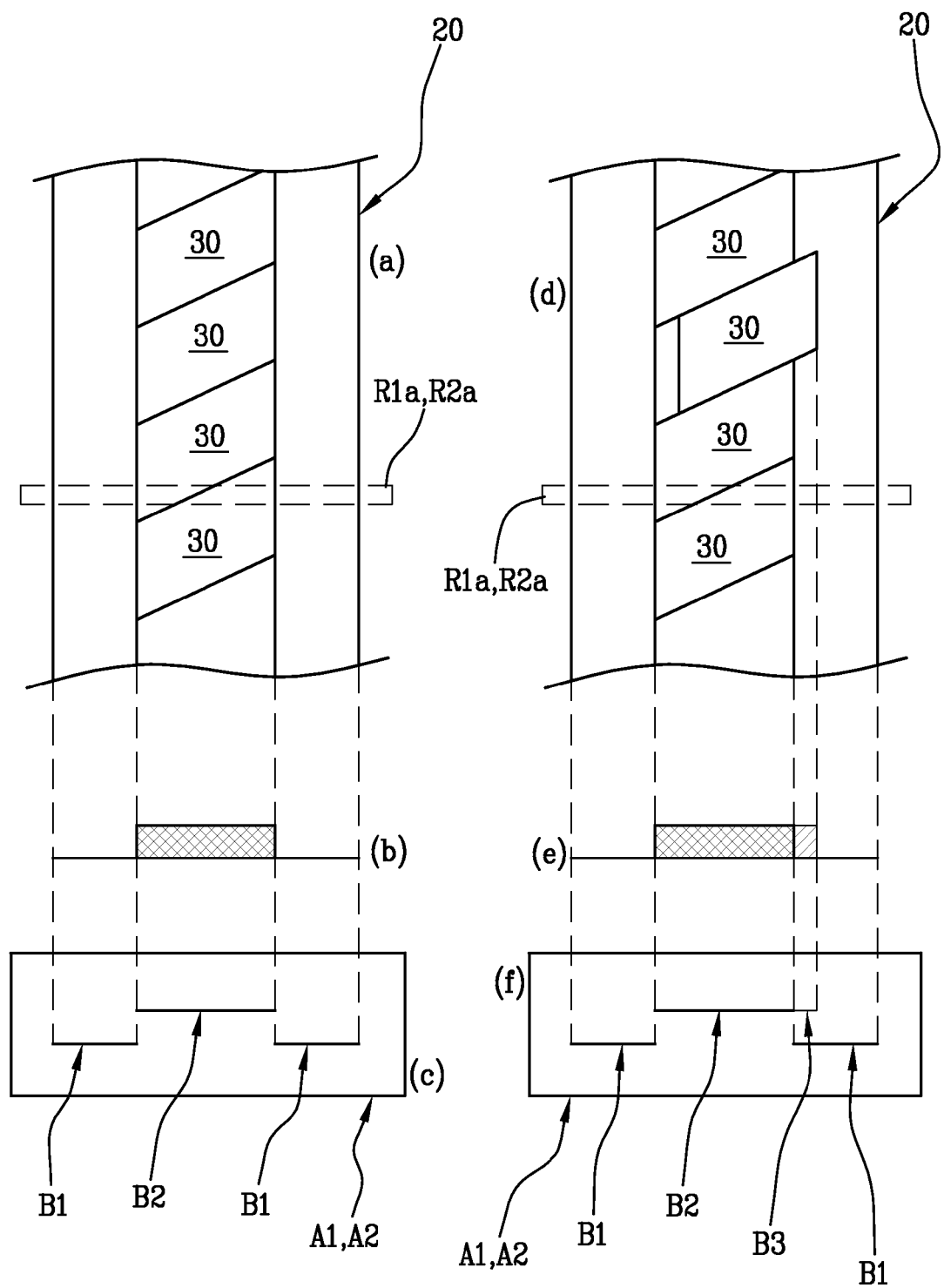
FIGS. 3a, 3d, 4a, 4d schematically show some elementary semifinished products part of a tyre being processed.
FIGS. 3b, 3e, 4b, 4e show tangential profiles of the semifinished products of FIGS. 3a, 3d, 4a, 4d.
FIGS. 3c, 3f, 4c, 4f show images obtained through the method and the apparatus according to the invention applied to the semifinished products of FIGS. 3a, 3d, 4a, 4d.
Figure 4:
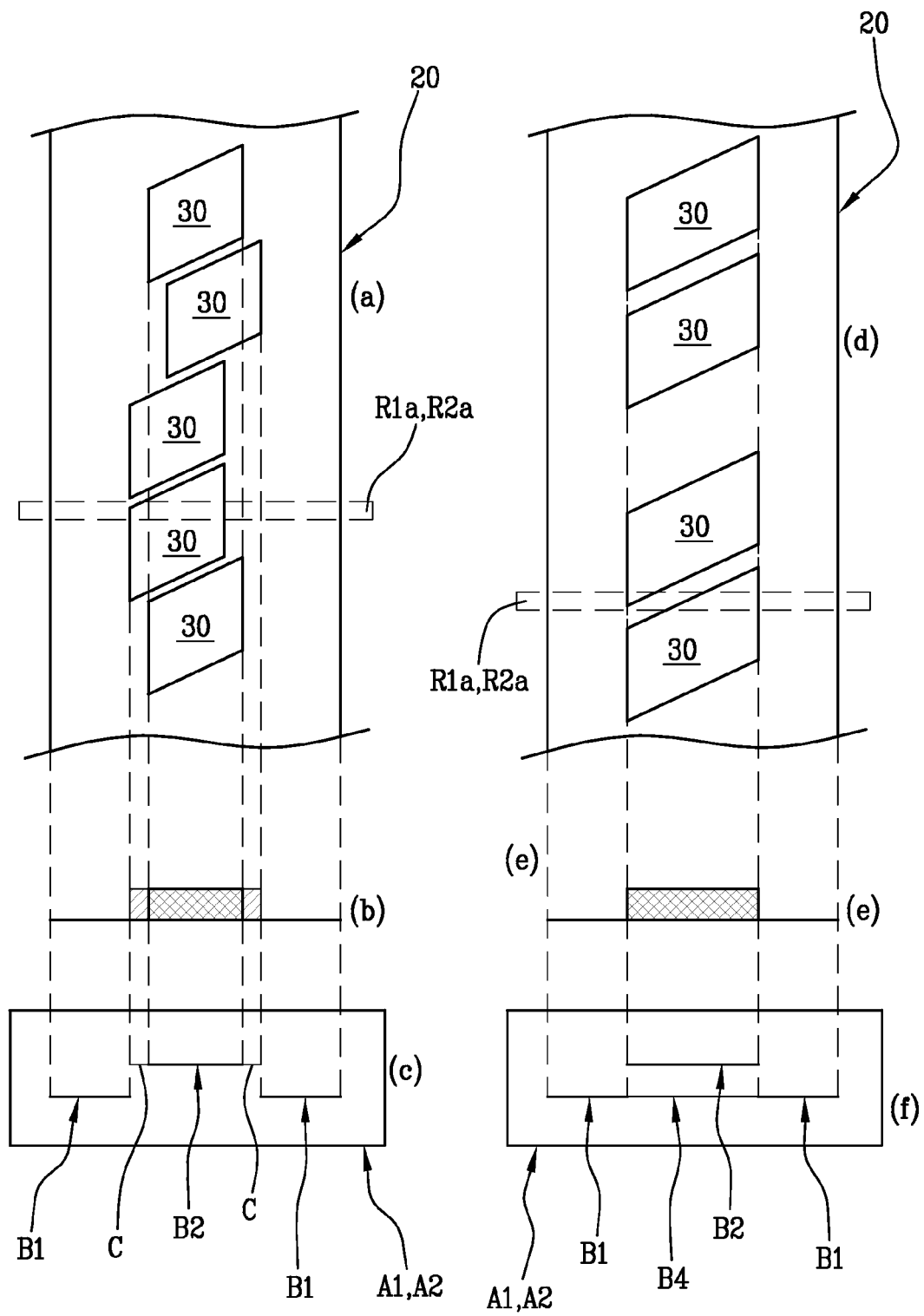

Preferably the elementary semifinished products 30 may be strip-like elements (FIG. 3a) and/or reinforcement elements (FIG. 4a).

The elementary semifinished products 30 are deposited in a radially external position on the forming support 50 to provide one or more components of the tyre being processed 10.

The present invention particularly applies to contexts in which the deposition of the elementary semifinished products 30 has already been performed. In particular the method and the apparatus according to the invention allow verifying whether the deposition of the elementary semifinished products 30 was carried out according to the project specifications and, thus, whether the resulting tyre will meet the required structural and quality characteristics.

Figure 2:
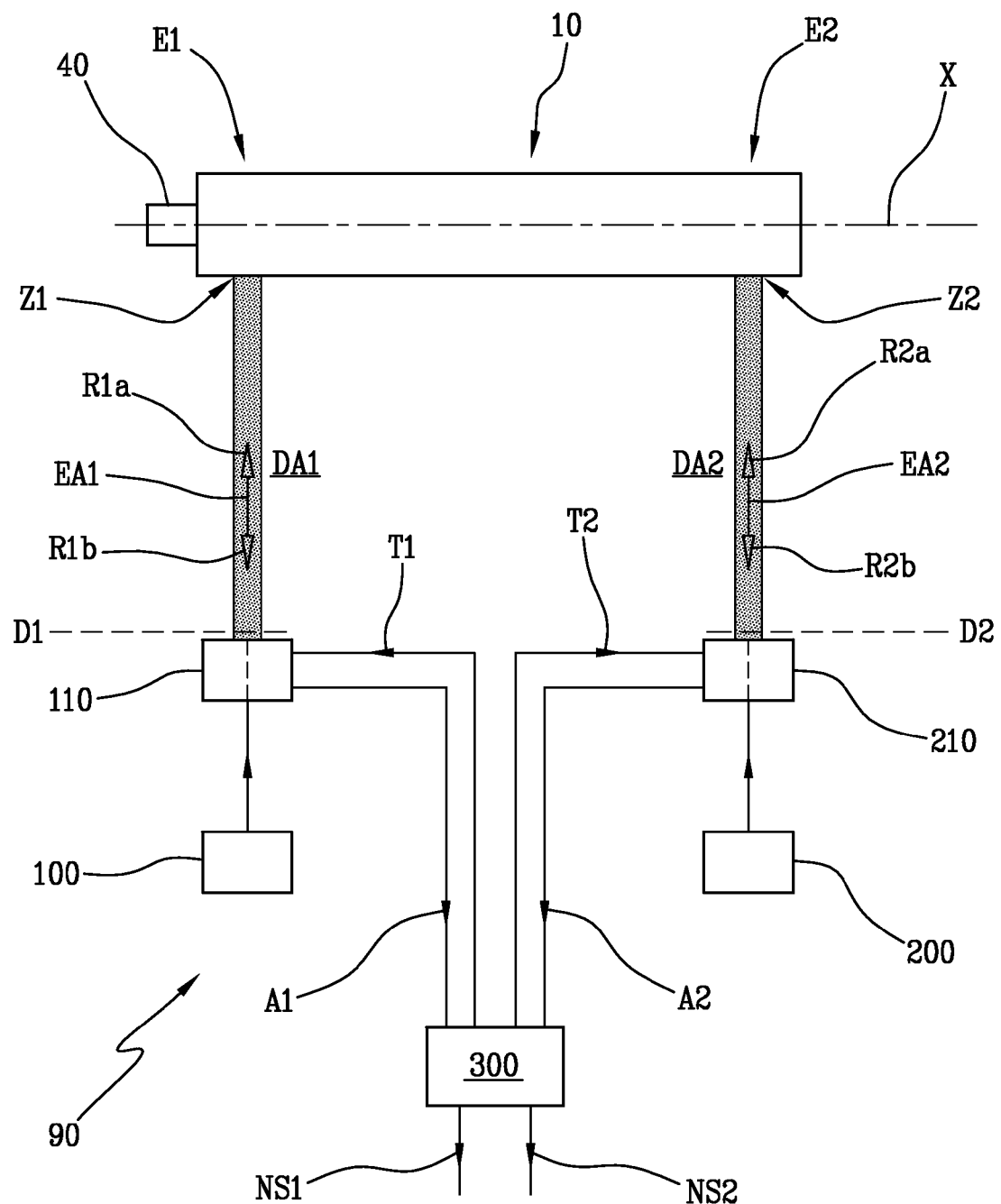
FIG. 2 schematically shows a plan view of the apparatus of FIG. 1.

The tyre being processed 10 is rotated around a rotation axis X thereof (FIGS. 1, 2).

Preferably such movement is carried out by a suitable actuating member 40, schematically illustrated in FIG. 2.

The actuating member 40 may comprise an electromechanical actuator and/or suitable kinematic control, with the aim of imparting the rotational motion to the tyre being processed 10.

Preferably the rotation speed ω of the tyre being processed 10 is comprised between about π/8 rad/s and about 6π rad/s.

More in particular, the rotation speed ω of the tyre being processed 10 is comprised between about π/2 rad/s and about 2π rad/s.

The method according to the invention comprises sending a first electromagnetic radiation R1a to the radially external surface 20 of the tyre being processed 10.

Preferably, the first electromagnetic radiation R1a is generated by a first emitter device 100.

In particular, the first emitter device 100 may be a laser emitter.

The wavelength of the first electromagnetic radiation R1a may be comprised between 500 nm and 700 nm.

More in particular such wavelength may be comprised between 600 nm and 650 nm.

Preferably the first electromagnetic radiation R1a is a so-called "laser blade", i.e. a radiation which, when it strikes on a surface substantially orthogonal to the direction of propagation thereof, generates a substantially linear, practically rectangular, light form having a much larger dimension with respect to the other.

What actually occurs is that the laser beam emitted by the first emitter device 100 is deformed by the profile of the radially external surface 20 upon the passage thereof; a first detecting device 110, which will be described more in detail hereinafter, thus generates a first image A1 which represents this phenomenon through the radiation which is reflected.

Preferably the first emitter device 100 is positioned on a first emission plane EA1 joining the first emitter device 100 itself to the portion of radially external surface 20 impinged on by the first electromagnetic radiation R1a. In practice the first emission plane EA1 describes the path followed by the first electromagnetic radiation R1a in the propagation thereof from the first emitter device 100 to the radially external surface 20 of the tyre being processed 10.

Actually, as mentioned, the first electromagnetic radiation R1a is substantially a "laser blade" and the spatial region along which it propagates may be assimilated to a planar surface.

In a preferred embodiment, the first emission plane EA1 forms, with a through plane for the rotation axis X of the tyre being processed and for a first region Z1 of incidence of the first electromagnetic radiation R1a, an angle included between 30° and 60°, and in particular substantially equal to about 45°.

FIG. 1 schematically shows the line of the first emission plane EA1 on a plane orthogonal to the rotation axis X of the tyre being processed 10 and passing through the first region Z1 of incidence.

The first electromagnetic radiation R1a is at least partly reflected by the radially external surface 20; thus this allows obtaining a corresponding first reflected radiation R1b.

At least one first image A1 representative of said first reflected radiation R1b is detected through a first detecting device 110.

In other words, the first detecting device 110 is positioned so as to be impinged on by the first reflected radiation R1b and, due to the sensing capacity thereof, it is capable of generating at least the aforementioned first image A1, representative of the radiation thus received.

Preferably the first detecting device 110 comprises a digital camera, suitably controlled so as to provide, as an output, static images, as if it were a photo camera. Alternatively, the first detecting device 110 may comprise a photo camera.

Preferably, the first detecting device 110 may comprise one or more CCD sensors, for example of the monochromatic type; the latter may operate at 8 bits or at 16 bits.

Preferably the first detecting device 110 may comprise a lens (not illustrated).

Preferably the first detecting device 110 is provided with a detecting window 110a (schematically shown in FIG. 5) having a major direction of extension D1 substantially parallel to the rotation axis X of the tyre being processed 10 (FIGS. 2, 5).

In terms of the geometric position, the first detecting device 110 is positioned on a first detection plane DA1 joining the first detecting device 110 itself to the portion of said radially external surface 20 impinged on by the first electromagnetic radiation R1a, i.e. the mentioned first region Z1 of incidence.

Such first detection plane DA1 is schematically shown in FIGS. 1 and 2.

Preferably the first detection plane DA1 is a through plane for the rotation axis X of the tyre being processed 10 and for the first region Z1 of incidence of the first electromagnetic radiation R1a.

Preferably the first detection plane DA1 defines with the first emission plane EA1 an angle α1 included between about 30° and about 60°, and in particular substantially equal to about 45°.

FIG. 1 schematically shows the line of the first detection plane DA1 on a plane orthogonal to the rotation axis X of the tyre being processed 10 and passing through the first region Z1 of incidence.

Preferably the first detecting device 110 is controlled in such a manner that a first exposure time T1 for detecting the first image A1 is included between about 0.1 s and about 10 s.

In particular the first exposure time T1 may be included between about 1 s and about 4 s.

In a preferred embodiment, the first exposure time T1 is equal to at least the time employed by the tyre being processed 10 for carrying out a full revolution around the rotation axis X thereof.

Thus, suitably regulating the first exposure time T1, preferably in combination with the rotation speed ω of the tyre being processed 10, allows obtaining a first image A1. The latter summarises information regarding the circumferential portion of the radially external surface 20 which was lighted by the first electromagnetic radiation R1a, and detected by the first detecting device 110, during such first exposure time T1.

In other words, due to the rotary movement of the tyre being processed 10, a different circumferential portion of the radially external surface 20 (actually, it should be borne in mind that the first emitter device 100 and the first detecting device 110 are substantially fixed with respect to the reference system relative to which the tyre being processed 10 is moved in rotation) is lighted and detected at each instant.

The first image A1 shall thus be formed by a sort of superimposition of virtually instantaneous images each representative of a respective portion of radially external surface 20 having an extremely small circumferential dimension.

Following the detection of the first image A1, a first comparison between such first image A1 and one or more reference data Ref is carried out. A first notification signal NS1 is generated as a function of the first comparison.

The reference data Ref may comprise data defined as a function of the previous detecting operations carried out by the first detecting device 110. In practice the first image A1 is compared with the previous analogous images, detected by the first detecting device 110, so as to verify whether the various deposition operations were carried out in a homogenous and coherent manner over time.

Additionally or alternatively, the reference data Ref may comprise data defined on a statistical basis as a function of the previous detecting operations. Thus, using statistical criteria, it is possible to define summarised values, for example representative of the overall quality of the tyre, which may allow determining whether the tyre itself may be used for further processes and/or commercialisation, or whether it should be discarded due to lack of the required characteristics.

In an embodiment, the first notification signal NS1 may be representative of a positioning of one or more elementary semifinished products 30 part of the radially external surface 20.

Additionally or alternatively, the first notification signal NS1 may be representative of a lack of deposition of one or more elementary semifinished products 30.

By way of example, FIGS. 3a-3c, 3d-3f and 4a-4c, 4d-4f may be considered.

FIG. 3a schematically shows a radially external surface 20 formed by a plurality of strip-like elements 30 arranged adjacent to each other.

As observable, the strip-like elements are deposited accurately and free of errors.

Still FIG. 3a schematically shows the first electromagnetic radiation R1a, R2a (i.e. the aforementioned "laser blade") incident to the radially external surface 20.

FIG. 3b schematically shows the tangential profile of the tyre being processed 10 in this situation, while FIG. 3c schematically shows the first detected image A1.

The first image A1 is substantially formed by two basic light stretches B1, representing the surface on which the strip-like elements 30 were deposited, and a light deposition stretch B2, representative of the deposited strip-like elements.

As mentioned, the deposition was accurate and correct. Hence, the stretches B1 and B2 are homogeneous, clear and well distinguished with respect to each other.

FIG. 3d instead shows a situation in which there occurred a positioning error when depositing the strip-like element.

FIG. 3e shows, with a less dense patterning, the excess profile portion on the right side.

FIG. 3f shows the first image A1 detected in this situation: besides the two basic stretches B1 and the deposition stretch B2, there is observed a further lateral stretch B3, markedly less intense than the others. This is due to the single erroneously positioned strip-like element which, over the period of time in which it was lighted and detected, caused a brief deformation of the light beam represented by the lateral stretch B3.

In practice the stretches B1 and B2 are given by the superimposition, during the first exposure time T1, of the radiation reflected by the deposition surface and by the strip-like elements. Given that the deposition surface is always identical to itself, and given that the larger part of the strip-like elements deposited so as to provide the same profile, such stretches B1 and B2 are particularly intense and well outlined.

Vice versa, the stretch B3 is due to only one strip-like element, which was lighted and detected over a period of time considerably shorter than the first overall exposure time T1. Therefore, the stretch B3 is considerably less intense.

The first notification signal NS1, deriving from the analysis of the first image A1, may thus be representative of the positioning of one or more elementary semifinished products 30.

FIGS. 4a-4c and 4d-4f refer to the deposition of reinforcement elements.

FIG. 4a schematically shows a series of reinforcement elements 30 part of the radially external surface 20.

FIG. 4b shows the tangential profile of the external surface 20, and FIG. 4c shows the first image A1.

The various reinforcement elements are not positioned in a perfectly circumferential manner. This is observable, in the first image A1, in the stretches C, clearly distinguished from stretches B1, B2 due to the lesser intensity thereof.

The analysis which may be carried out on a first image A1 of this type may consist in evaluating whether the stretches C are longer or shorter than a given threshold, so as to determine whether the inaccuracies in the deposition may be deemed acceptable, or whether the tyre being processed 10 shall be discarded.

FIG. 4d shows a situation in which an error occurred leading to the lack of deposition of one of the reinforcement elements.

The first image A1, besides the basic stretches B1 and the deposition stretch B2, has an auxiliary stretch B4 due to the fact that, over a given period of time, there were no elementary semifinished products on which the first electromagnetic radiation R1a could strike and, thus, the reflection was entirely caused by the deposition surface (i.e. the surface on which the elementary semifinished products 30 were deposited, constituted by the external surface of the forming support or by a tyre component already present on the forming support itself).

In this case, the first notification signal NS1 may thus provide indications regarding the fact that an elementary semifinished product was not deposited.

In a preferred embodiment, a second image A2 is detected besides the first image A1.

The second image A2 is preferably detected using the same operating modes with respect to the first image A1.

The method according to the invention may thus comprise sending a second electromagnetic radiation R2a to the radially external surface 20 of the tyre being processed 10.

Preferably, the second electromagnetic radiation R2a is generated by a second emitter device 200.

In particular, the second emitter device 200 may be a laser emitter.

The wavelength of the second electromagnetic radiation R2a may be comprised between about 500 nm and about 700 nm.

More in particular such wavelength may be comprised between about 600 nm and about 650 nm.

Preferably the wavelength of the first and the second electromagnetic radiation R1a, R2a is substantially the same.

Preferably the second electromagnetic radiation R2a is a so-called "laser blade", i.e. a radiation which, upon striking on a surface substantially orthogonal to the direction of propagation thereof, generates a substantially linear, practically rectangular, light form having a much larger dimension with respect to the other.

Thus, there occurs the same phenomenon described above with reference to the first electromagnetic radiation R1a.

Preferably the second emitter device 200 is positioned on a second emission plane EA2 joining the second emitter device 200 itself with the portion of radially external surface 20 impinged on by the second electromagnetic radiation R2a.

In practice the second emission plane EA2 describes the path followed by the second electromagnetic radiation R2a in the propagation thereof from the second emitter device 200 to the radially external surface 20 of the tyre being processed 10.

Actually, as mentioned, the second electromagnetic radiation R2a is substantially a "laser blade" and the spatial region along which it propagates may be similar to a planar surface.

In a preferred embodiment, the second emission plane EA2 forms, with a plane passing through the rotation axis X of the tyre being processed 10 and through a second region Z2 of incidence of the second electromagnetic radiation R2a, an angle included between 30° and 60°, and in particular substantially equal to a about 45°.

FIG. 1 schematically shows the line of the second emission plane EA2 on a plane orthogonal to the rotation axis X of the tyre being processed 10 and passing through the first region Z1 of incidence.

The second electromagnetic radiation R2a is at least partly reflected by the radially external surface 20; this allows obtaining a corresponding second reflected radiation R2b.

A second detecting device 210 allows detecting at least a second image A2 representative of said second reflected radiation R2b.

In other words, the second detecting device 210 is positioned so as to be impinged on by the second reflected radiation R2b and, due to the sensor capacity thereof, it is capable of generating at least the aforementioned second image A2, representative of the radiation thus received.

Preferably the second detecting device 210 comprises a digital camera, suitably controlled so as to provide, as output, static images, as if it were a photo camera. Alternatively, the second detecting device 210 may comprise a photo camera.

Preferably, the second detecting device 210 may comprise one or more CCD sensors, for example of the monochromatic type; the latter may operate at 8 bits or at 16 bits.

Preferably the second detecting device 210 may comprise a lens (not illustrated).

Preferably the second detecting device 210 is provided with a detecting window 210a (schematically shown in FIG. 5) having a major direction of extension D2 substantially parallel to the rotation axis X of the tyre being processed 10 (FIGS. 2, 5).

In terms the geometric positioning, the second detecting device 210 is positioned on a second detection plane DA2 joining the second detecting device 210 itself to the portion of said radially external surface 20 impinged on by the second electromagnetic radiation R2a, i.e., the aforementioned second region Z2 of incidence.

Such second detection plane DA2 is schematically shown in FIGS. 1 and 2.

Preferably the second detection plane DA2 is a plane passing through the rotation axis X of the tyre being processed 10 and the second region Z2 of incidence of the second electromagnetic radiation R2a.

Preferably the second detection plane DA2 defines, with the second emission plane EA2, an angle $\alpha 2$ included between about 30° and about 60°, and in particular substantially equal to a about 45°.

FIG. 1 schematically shows the line of the second detection plane DA2 on a plane orthogonal to the rotation axis X of the tyre being processed 10 and passing through the first region Z1 of incidence.

Preferably the second detecting device 210 is controlled in such a manner that a second exposure time T2 for detecting the second image A2 is included between about 0.1 s and about 10 s.

In particular the second exposure time T2 may be included between about 1 s and about 4 s.

Preferably, the first exposure time T1 and the second exposure time T2 are substantially identical.

In a preferred embodiment, the second exposure time T2 is equal to at least the time employed by the tyre being processed 10 for carrying out a full revolution around the rotation axis X thereof.

Thus, suitably regulating the second exposure time T2, preferably in combination with the rotation speed ω of the tyre being processed 10, allows obtaining a second image A2. The latter summarises the information relative to the circumferential portion of the radially external surface 20 that was lighted by the second electromagnetic radiation R2a, and detected by the second detecting device 210, during such second exposure time T2.

The second image A2 shall thus be formed by a sort of superimposition of virtually instantaneous images each representative of a respective portion of radially external surface 20 having an extremely small circumferential dimension.

Following the detection of the second image A2, a second comparison between such second image A2 and one or more reference data Ref is carried out. A second notification signal NS2 is generated as a function of the second comparison.

The reference data Ref may comprise data defined as a function of the previous detecting operations carried out by the second detecting device 210. In practice the second image A2 is compared with the previous analogous images, detected by the second detecting device 210, so as to verify whether the various deposition operations were carried out in a homogenous and coherent manner over time.

Additionally or alternatively, the reference data Ref may comprise data defined on a statistical basis as a function of the previous detecting operations. Thus, using statistical criteria, it is possible to define summarised values, for example representative of the overall quality of the tyre, which may allow determining whether the tyre itself may be may be used for further processes and/or commercialisation, or whether it should be discarded due to lack of the required characteristics.

In an embodiment, the second notification signal NS2 may be representative of a positioning of one or more elementary semifinished products 30 part of the radially external surface 20.

The first and the second electromagnetic radiation R1a, R2a, may be advantageously employed for monitoring axially distinct portions of the tyre being processed 10.

Preferably the first electromagnetic radiation R1a strikes on a first region Z1 of the radially external surface 20, and the second electromagnetic radiation R2a strikes on a second region Z2 of the radially external surface 20.

In particular, the first and the second region Z1, Z2 may be defined by respective axial-end regions E1, E2 of the tyre being processed 10. Generally, the first and the second image A1, A2 may seem very similar to each other, without jeopardise to the fact that they represent different parts of the tyre being processed 10. Thus, FIGS. 3c, 3f, 4c, 4f may also be considered representative of second images A2.

The first and/or the second notification signal NS1, NS2 may also be generated as a function of a comparison between a first image A1 and a second image A2, so as to provide information regarding a symmetry/lack of symmetry of corresponding portions of the tyre being processed 10. In other words, the reference data Ref regarding the performance of the first and/or second comparison may respectively comprise data representative of the second and/or first image A2, A1.

In an embodiment, the first and/or the second image A1, A2 may be detected during the so-called "rolling", so as not to affect the time-cycle, i.e. the overall tyre building time or part thereof, in any manner whatsoever.

As mentioned, the present invention also regards an apparatus for controlling the elementary deposition of semifinished products in a process for building tyres for vehicle wheels.

Such apparatus, schematically illustrated in FIG. 2, is indicated in its entirety with reference number 90.

The apparatus 90 comprises the actuating member 40, active on the tyre being processed 10.

The apparatus 90 also comprises the first emitter device 100 and the first detecting device 110.

The apparatus 90 also comprises a control unit 300 configured for controlling the first detecting device 110, in such a manner that the first exposure time T1 for the detection of the first image A1 is the one described above.

Preferably the control unit 300 may be configured for also controlling the aforementioned actuating member 40, in particular for regulating the rotation speed ω of the tyre being processed 10.

The control unit 300 is also configured for carrying out the aforementioned first comparison between the first image A1 and the reference data Ref, and for generating the ensuing first notification signal NS1.

Preferably the apparatus 90 further comprises the second emitter device 200, and the second detecting device 210.

Preferably the control unit 300 is also configured for controlling the second exposure time T2 of the second detecting device 210.

Preferably, the control unit 300 is also configured for carrying out the aforementioned second comparison between the second image A2 and the reference data Ref, and for generating the ensuing second notification signal NS2.

Preferably, the control unit 300 may also be configured for carrying out the aforementioned comparison between the first and the second image A1, A2.

As mentioned above, the forming support 50 may have variable dimensions. Advantageously, the method and the apparatus according to the invention are capable of operating correctly, within given limits, with forming supports of different diameter: besides the fact that there should be sufficient field depth, the condition that requires to be met lies in that the visual field of the first and/or second detecting device 110, 210 covers the two extreme conditions of maximum diameter and minimum diameter, at which the lighted line reproduced by the first/second image A1, A2 is at the upper or lower end of the first/second image A1, A2 itself.

As regards dimensions smaller than the minimum one, or larger than the maximum one, the light line generated by the "laser blade" falls outside the visual field of the first/second detecting device 110, 210 and thus it cannot be reproduced in the first/second image A1, A2.

In light of the above, it can be observed that the position of the light line within the first/second image A1, A2 may allow determining the diameter of the forming support employed.

It should be observed that the control unit 300 was described as the sole logic device capable of performing the operations described above and claimed hereinafter. Actually, the control unit 300 may be obtained as a single physical device, or also as a combination of several electronic devices, suitably programmed and configured for carrying out the specified functions.

Advantageously the control unit 300 is configured for, or it is connected to operating modules configured for managing the packaging process. Thus, for example, the control unit 300 may have the data required for determining the first and/or the second exposure time T1, T2 available.

As regards the first and the second notification signal NS1, NS2, they can also be obtained as alert signals, for example of the acoustic and/or visual type, intended for designated operators, in particular should there arise the need to rapidly notify situations requiring immediate or short-term interventions.

Such notification signals NS1, NS2 may also be constituted by data and parameter transmissions, representative of the detecting operations and performed comparisons, and meant for a processor configured to store such information, and/or perform the control and verification functions or any other notifications according to the preset logics.

The invention claimed is:

1. A method for controlling the deposition of elementary semifinished products in a process for building a tyre for vehicle wheels, comprising:
    driving in rotation a tyre being processed around a rotation axis at a rotation speed between about $\pi/8$ rad/s and about $6\pi$ rad/s, said tyre having a radially external surface comprising one or more elementary semifinished products;
    sending a first electromagnetic radiation to said radially external surface, the radially external surface generating a corresponding first reflected radiation;
    detecting, through a first detecting device, at least one first image representative of said first reflected radiation, wherein the at least one first image is obtained by a detecting window substantially parallel to the rotation axis of said tyre being processed;
    controlling said first detecting device in such a manner that a first exposure time for detecting said at least one first image is between about 0.1 s and about 10 s;
    carrying out a first comparison between said at least one first image and one or more reference data; and
    generating a first notification signal as a function of said first comparison.

2. The method as claimed in claim 1, wherein said first exposure time is between about 1 s and about 4 s.

3. The method as claimed in claim 1, wherein said rotation speed of said tyre being processed is between about $\pi/2$ rad/s and about $2\pi$ rad/s.

4. The method as claimed in claim 1, wherein said first exposure time is equal to at least a time employed by said tyre being processed for carrying out a full revolution around said rotation axis.

5. The method as claimed in claim 1, wherein said first detecting device is positioned on a first detection plane joining said first detecting device to a first region of incidence of said radially external surface impinged on by said first electromagnetic radiation.

6. The method as claimed in claim 1, further comprising providing at least one first emitter device for sending said first electromagnetic radiation onto said radially external surface.

7. The method as claimed in claim 6, wherein said first emitter device is positioned along a first emission plane joining said first emitter device to a first region of incidence of the radially external surface impinged on by said first electromagnetic radiation.

8. The method as claimed in claim 7, wherein said first detecting device is positioned on a first detection plane joining said first detecting device to a first region of incidence of said radially external surface impinged on by said first electromagnetic radiation, and wherein said first detection plane defines an angle between about 30° and about 60° with said first emission plane.

9. The method as claimed in claim 1, wherein said one or more reference data comprise data defined as a function of previous detecting operations carried out by said first detecting device.

10. The method as claimed in claim 1, wherein said one or more reference data comprise data defined on a statistical basis as a function of previous detecting operations.

11. The method as claimed in claim 1, wherein said first notification signal is representative of positioning of one or more of said elementary semifinished products.

12. The method as claimed in claim 1, wherein said first notification signal is representative of lack of deposition of at least one elementary semifinished product.

13. The method as claimed in claim 1, comprising:
    sending a second electromagnetic radiation onto said radially external surface, the radially external surface generating a corresponding second reflected radiation;
    detecting through a second detecting device, at least one second image representative of said second reflected radiation;
    controlling said second detecting device in such a manner that a second exposure time for detecting said at least one second image is between about 0.1 s and about 10 s;
    carrying out a second comparison between said at least one second image and one or more reference data; and
    generating a second notification signal as a function of said second comparison.

14. The method as claimed in claim 13, wherein said second exposure time is between about 1 s and about 4 s.

15. The method as claimed in claim 13, wherein said second exposure time is equal to at least a time employed by said tyre being processed for carrying out a full revolution around said rotation axis.

16. The method as claimed in claim 13, wherein said first electromagnetic radiation strikes on a first region of said radially external surface, and said second electromagnetic radiation strikes on a second region of said radially external surface.

17. The method as claimed in claim 16, wherein said first and second regions are defined by respective axial-end regions of said tyre being processed.

18. The method as claimed in claim 13, wherein said first and/or second electromagnetic radiation has a wavelength between about 500 nm and about 700 nm.

19. The method as claimed in claim 13, wherein said first and/or second detecting device comprises a CCD sensor operating at 8 bits or 16 bits.

20. An apparatus for controlling the deposition of elementary semifinished products in a process for building a tyre for vehicle wheels, comprising:
    an actuating member for driving a tyre being processed in rotation around a rotation axis, at a rotation speed between about $\pi/8$ rad/s and about $6\pi$ rad/s, said tyre having a radially external surface comprising one or more elementary semifinished products;
    a first emitter device adapted to send a first electromagnetic radiation onto said radially external surface, the radially external surface generating a corresponding first reflected radiation;
    a first detecting device adapted to detect at least one first image representative of said first reflected radiation, wherein the at least one first image is obtained by a detecting window substantially parallel to the rotation axis of said tyre being processed; and a control unit configured for:
a) controlling said first detecting device in such a manner that a first exposure time for detecting said at least one first image is between about 0.1 s and about 10 s;
b) carrying out a first comparison between said at least one first image and one or more reference data; and
c) generating a first notification signal as a function of said first comparison.

21. The apparatus as claimed in claim 20, wherein said first exposure time is between about 1 s and about 4 s.

22. The apparatus as claimed in claim 20, wherein said rotation speed of said tyre being processed is between about π/2 rad/s and about 2π rad/s.

23. The apparatus as claimed in claim 20, wherein said first exposure time is equal to at least a time employed by said tyre being processed for carrying out a full revolution around said rotation axis.

24. The apparatus as claimed in claim 20, wherein said first detecting device is positioned on a first detection plane joining said first detecting device to a first region of incidence of said radially external surface impinged on by said first electromagnetic radiation.

25. The apparatus as claimed in claim 20, wherein said first emitter device is positioned on a first emission plane joining said first emitter device to a first region of incidence of the radially external surface impinged on by said first electromagnetic radiation.

26. The apparatus as claimed in claim 25, wherein said first detecting device is positioned on a first detection plane joining said first detecting device to a first region of incidence of said radially external surface impinged on by said first electromagnetic radiation, and wherein said first detection plane defines an angle between about 30° and about 60° with said first emission plane.

27. The apparatus as claimed in claim 20, comprising:
a second emitter device adapted to send a second electromagnetic radiation onto said radially external surface, the radially external surface generating a corresponding second reflected radiation; and
a second detecting device adapted to detect at least one second image representative of said second reflected radiation,
wherein said control unit is also configured for:
a') controlling said second detecting device in such a manner that a second exposure time for detecting said at least one second image is between about 0.1 s and about 10 s;
b') carrying out a second comparison between said at least one second image and one or more reference data; and
c') generating a second notification signal as a function of said second comparison.

28. The apparatus as claimed in claim 27, wherein said second exposure time is between about 1 s and about 4 s.

29. The apparatus as claimed in claim 27, wherein said first electromagnetic radiation strikes on a first region of said radially external surface, and said second electromagnetic radiation strikes on a second region of said radially external surface.

30. The apparatus as claimed in claim 29, wherein said first and second regions are defined by respective axial-end regions of said tyre being processed.

31. The apparatus as claimed in claim 27, wherein said first and/or second electromagnetic radiation has wavelength between about 500 nm and about 700 nm.

32. The apparatus as claimed in claim 27, wherein said first and/or second detecting device comprises a CCD sensor operating at 8 bits or 16 bits.

33. The apparatus as claimed in claim 20, wherein a forming support of said tyre being processed has a cylindrical or toroidal shape having a diameter between 18" and 24".

34. A method for controlling deposition of elementary semifinished products in a process for building a tyre for vehicle wheels, comprising:
driving in rotation, around a rotation axis, a tyre being processed having a radially external surface comprising one or more elementary semifinished products;
sending a first electromagnetic radiation onto said radially external surface, the radially external surface generating a corresponding first reflected radiation;
detecting, through a first detecting device, at least one first image representative of said first reflected radiation, wherein the at least one first image is obtained by a detecting window substantially parallel to the rotation axis of said tyre being processed;
controlling said first detecting device in such a manner that a first exposure time for detecting said at least one first image is between about 0.1 s and about 10 s;
carrying out a first comparison between said at least one first image and one or more reference data; and
generating a first notification signal as a function of said first comparison.

35. The method as claimed in claim 34, wherein a rotation speed of said tyre being processed is between about π/8 rad/s and about 6π rad/s.

36. The method as claimed in claim 34, wherein a rotation speed of said tyre being processed is between about π/2 rad/s and about 2π rad/s.

37. The method as claimed in claim 34, wherein said first exposure time is between about 1 s and about 4 s.

38. An apparatus for controlling the deposition of elementary semifinished products in a process for building a tyre for vehicle wheels, comprising:
an actuating member for driving in rotation around a rotation axis, a tyre being processed having a radially external surface comprising one or more elementary semifinished products;
a first emitter device adapted to send a first electromagnetic radiation onto said radially external surface, the radially external surface generating a corresponding first reflected radiation;
a first detecting device adapted to detect at least one first image representative of said first reflected radiation, wherein the at least one first image is obtained by a detecting window substantially parallel to the rotation axis of said tyre being processed;
a control unit configured for:
a) controlling said first detecting device in such a manner that a first exposure time for detecting said at least one first image is between about 0.1 s and about 10 s;
b) carrying out a first comparison between said at least one first image and one or more reference data; and
c) generating a first notification signal as a function of said first comparison.

39. The apparatus as claimed in claim 38, wherein a rotation speed of said tyre being processed is between about π/8 rad/s and about 6π rad/s.

40. The apparatus as claimed in claim 38, wherein a rotation speed of said tyre being processed is between about π/2 rad/s and about 2π rad/s.

41. The apparatus as claimed in claim 38, wherein said first exposure time is between about 1 s and about 4 s.

* * * * *